(No Model.)

N. KEELER.
POTATO DIGGER.

No. 327,882. Patented Oct. 6, 1885.

Witnesses.
A. Ruppert.
Alfred T Gage.

Inventor:
Noah Keeler,
Per
Thomas P. Simpson,
attorney

UNITED STATES PATENT OFFICE.

NOAH KEELER, OF WALLACE, NEW YORK.

POTATO-DIGGER.

SPECIFICATION forming part of Letters Patent No. 327,882, dated October 6, 1885.

Application filed October 24, 1884. Serial No. 146,362. (No model.)

*To all whom it may concern:*

Be it known that I, NOAH KEELER, residing at Wallace, in the county of Steuben and State of New York, have invented an Improvement in Potato-Diggers, of which the following is a specification.

The special object of the invention is to improve the centrifugal separators of potato-diggers, so that they will not throw out the loose dirt with the potatoes, but allow it to pass down through the arms and back into the furrow, thus considerably lightening the draft of the digger and spreading the tubers more nakedly to view on one side of the furrow. The particular means for accomplishing this object will first be described in connection with the drawings, and then clearly pointed out in the claim.

Figure 1:
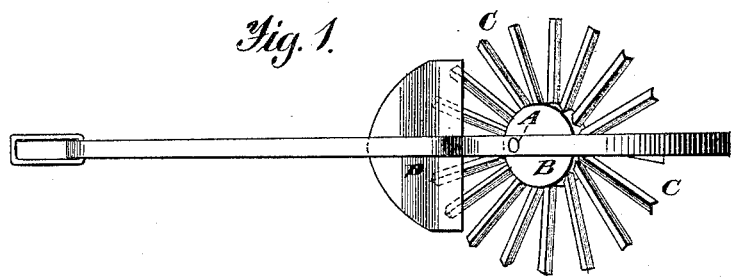
Figure 2:
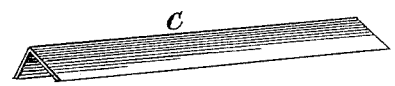
Figure 3:
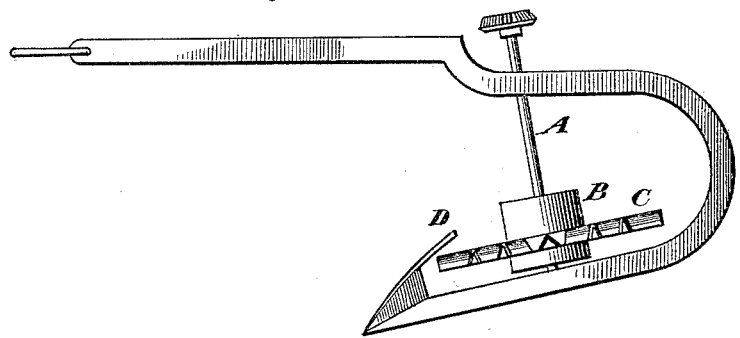

Figure 1 of the drawings is a plan view of the front lifting-plow and the separator which follows it. Fig. 2 is a detail view of one of the arms of the hub on rotary shaft. Fig. 3 is a side view with the arms rotating below the rear end of the lifting-plow, so that the earth will pass back from the plow and drop over on the arms, the loose dirt passing between them, while the potatoes and vines are thrown to one side.

In the drawings, A represents an ordinary rotary shaft placed out of a perpendicular and forwardly inclined at the top.

B is a hub made fast on this shaft and provided with arms C, which do not rotate in a horizontal plane, but in one forwardly and downwardly obliqued. The plane of their rotation may also be slightly obliqued toward the side on which the potatoes are thrown.

D represents the lifting plow or shovel or shoe, which must rise gradually from the front to the rear, so as to disintegrate the soil that surrounds the tubers and cause it to crumble. As it advances and raises the bed of earth in which the potatoes are located the vines, clods, crumbling soil and tubers are brought up the inclined plane and drop over into contact with the centrifugal arms C, when the loose earth and small lumps are carried by their gravity between the arms into the furrow.

The arms C are V-shaped in cross-section, made on a rounding or flat bevel from the middle downwardly on each side, to facilitate the passage of the dirt and reduce its friction as much as possible. It will thus be seen that the arms C not only perform the function of throwing out the potatoes centrifugally, but also act as sieves to separate the loose dirt, so that it will drop back into the furrow.

Heretofore arms have been used on a rotary shaft to act as beaters and allow the potatoes to pass between them, and also to carry them around to the rear of sifter, so as to drop directly into the furrow or into a discharging device; but

What I claim as new and of my invention is—

In potato-diggers, the combination, with a lifting-plow, of a rotary shaft carrying arms extending below the rear thereof and arranged to serve both as a dirt-sifter and a centrifugal thrower of potatoes of useful size to one side of the furrow, substantially as described.

NOAH KEELER.

Witnesses:
MERWIN E. BROWN,
CHAS. FINCH.